Patented Dec. 11, 1934

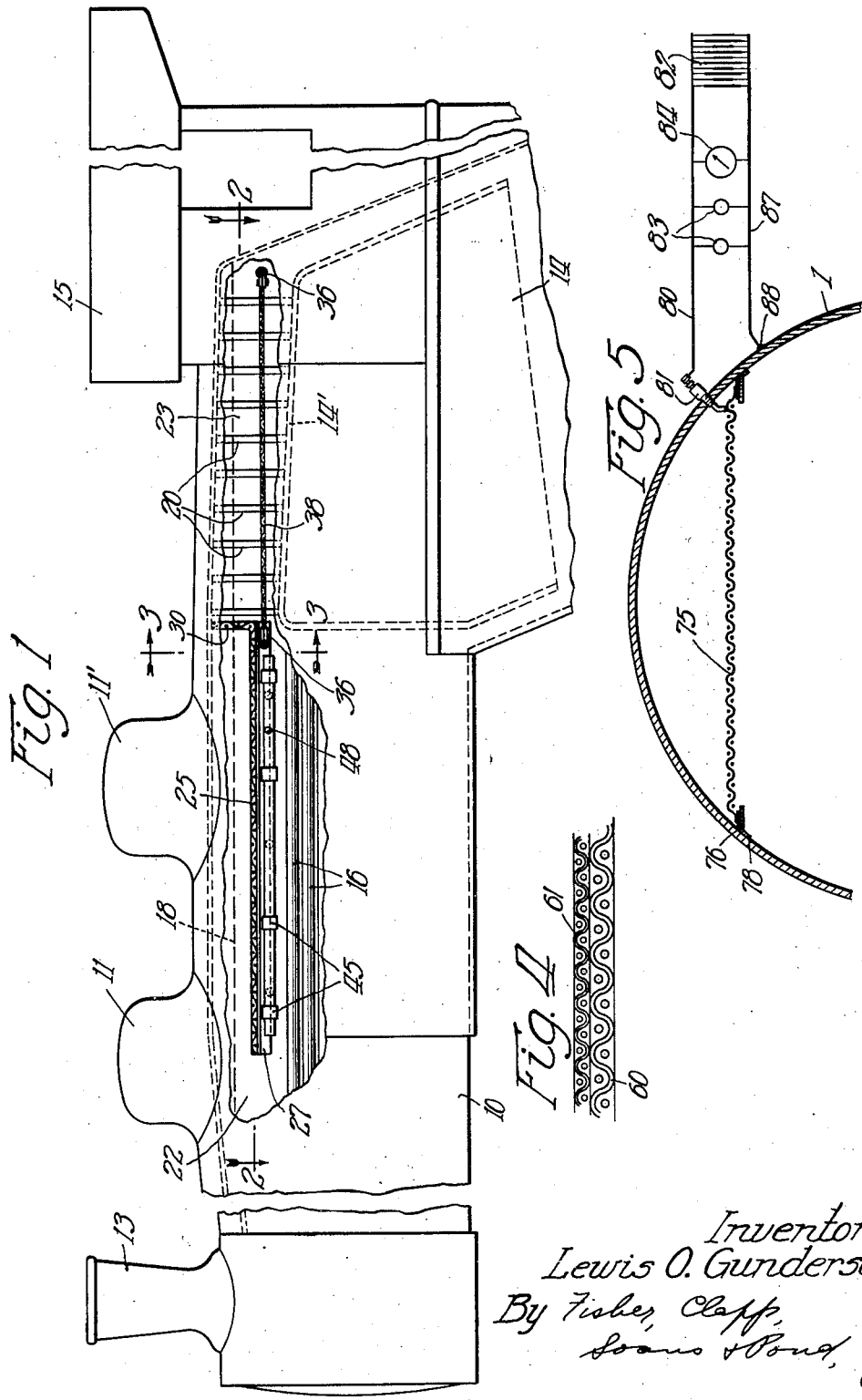

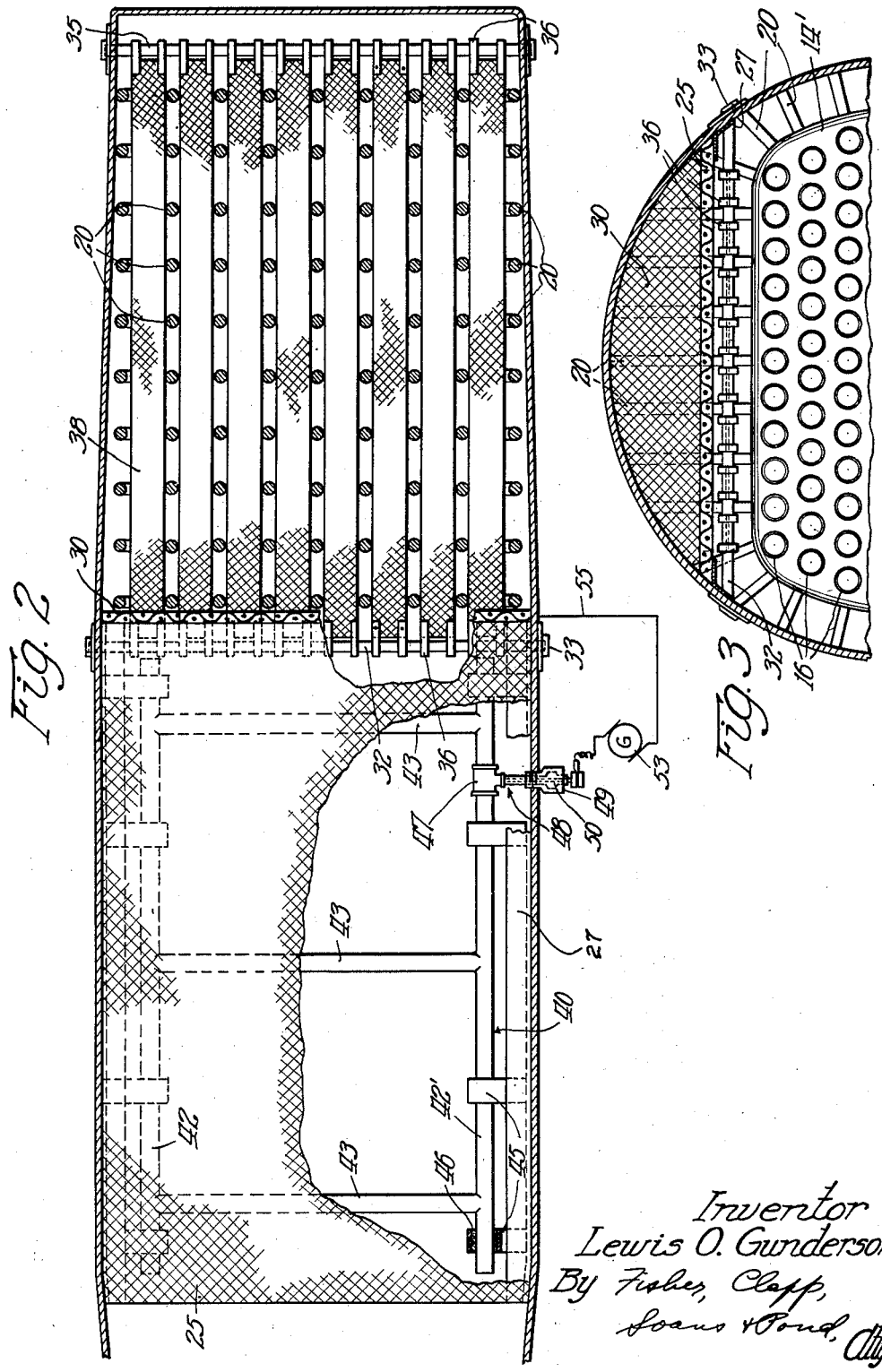

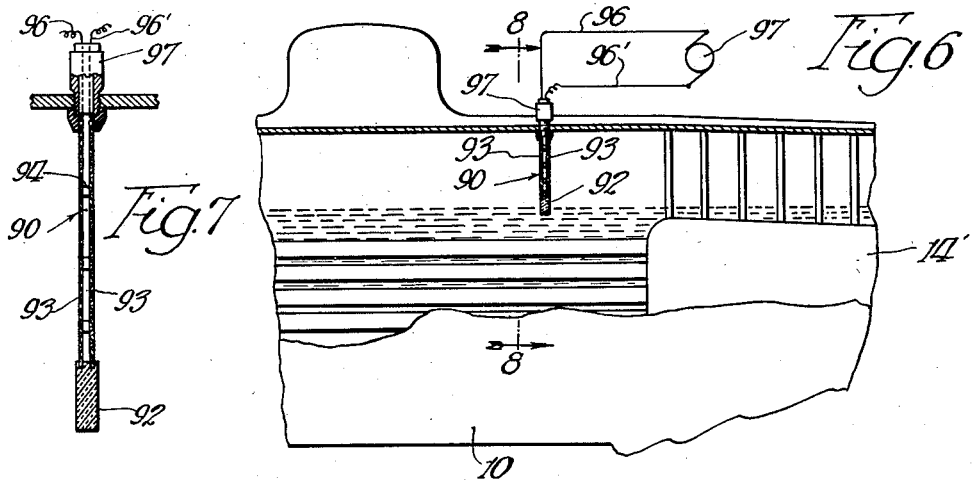
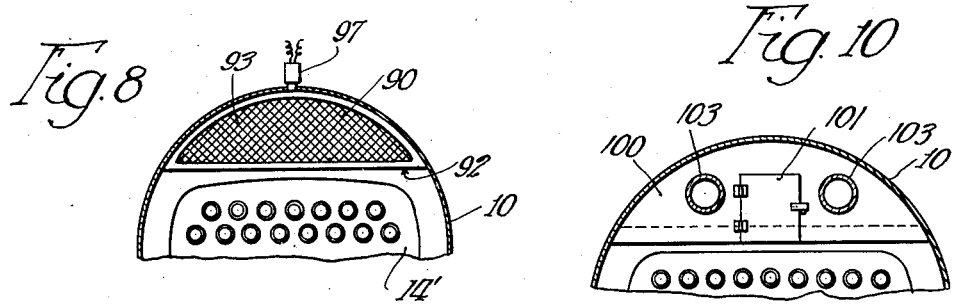
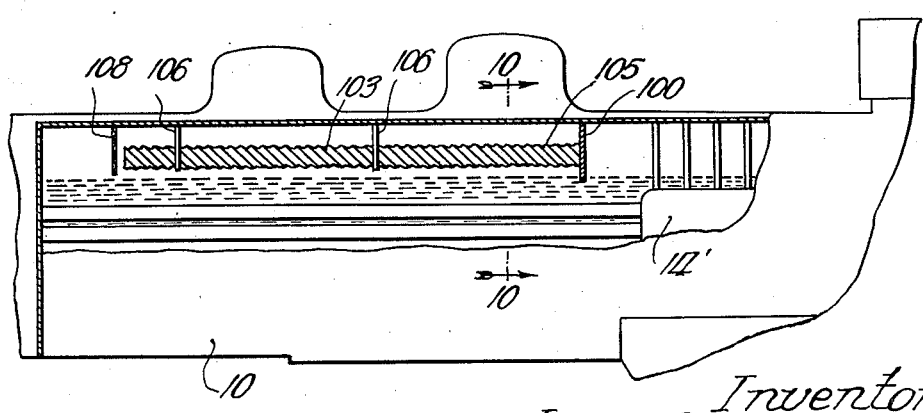

1,984,210

UNITED STATES PATENT OFFICE

1,984,210

METHOD AND APPARATUS FOR PREVENTING FOAMING OF LIQUIDS

Lewis O. Gunderson, Chicago, Ill., assignor, by mesne assignments, to Electro-Chemical Engineering Corporation, Chicago, Ill., a corporation of Delaware Application February 8, 1930, Serial No. 427,034

6 Claims. (Cl. 204—25)

My invention has to do with the prevention of foaming of liquids, and has to do more particularly with devices and methods which are especially adapted for use in connection with steam boilers and the like. It is well known that in the operation of steam boilers, the use of feed water containing even relatively small quantities of foreign matter in suspension, especially when finely divided, results in foaming and "priming". Such disturbances reduce the heat efficiency of the boiler, and cause trouble in the apparatus in which the steam is used. Therefore, they are highly objectionable.

It is known that foaming in a boiler is due to the presence of concentrations of salts in solution in the water in conjunction with a suspension of colloidal particles in the water. As is well known, such particles do not tend to settle out of the liquid but will remain in suspension indefinitely unless the conditions of equilibrium are altered. When the liquid begins to boil and bubbles are formed, these colloidal particles are adsorbed upon the surface of the film surrounding the bubbles, and due to the presence of electric charges of like sign on the colloidal particles they repel each other, and likewise the films surrounding the bubbles tend to repel each other. Therefore, it is seen that the presence of finely divided matter, particularly colloidal matter, in the boiler water will stabilize the films of the foam. Since the condition necessary to reduce a foam is the coagulation of the finely divided particles or colloidal dispersion and the coalescence of the bubbles making up the foam, it will be obvious that the presence of the electric charges of like polarity will tend to prevent the reduction of the foam.

It has long been known that colloidal dispersions have the power to adsorb ions on the surfaces of the fine particles and that such dispersions could be precipitated by chemical means, such as by adding just sufficient electrolyte to bring the adsorbed electrical charges into equilibrium, but to my knowledge, physical means have not previously been employed for the precipitation of such suspensions. I have made the astonishing discovery that such colloidal suspensions may be precipitated by physical means, particularly under certain conditions of heat and pressure, such as are found, for example, in a steam boiler.

Since my observation has demonstrated that positive ions are adsorbed on the colloidal dispersions in a locomotive boiler using alkaline water (a practically universal condition), the following will depict the mechanism of foam formation therein.

The gas-liquid interface of steam bubbles rising through the body of boiler water in a steam boiler presents a phenomenon of "positive adsorption", which simply means concentration of molecular and colloidal matter in the interface between steam and water, and these are carried to the surface and deposited there when the bubbles burst.

When the bubble reaches the surface, a film is formed in accordance with Foulk's description of the approach to each other of already existing surfaces; Ind. and Eng. Chem. 21: 8·? (1929). The film persists because the two surfaces will not merge due to the repelling force of the adsorbed ions of like charge in each of the surfaces. The permanence or persistence of the bubble or foam will depend upon the equilibrium between the forces tending to bring the surfaces together and the repelling force of the adsorbed electric charges of the same sign.

Continual operation of a steam boiler results in concentration of the dissolved salts and suspended matter in the boiler water, and my experience and observation have demonstrated that the positive adsorption also increases in the water-steam interface, resulting in reduced surface tension which is conducive to foam formation. (E. Hatschek: Physics and Chemistry of Colloids pp. 50, 81). Therefore, during the early stages of operation of a boiler, before dissolved salts in the body of the water are appreciably concentrated, the positive adsorption is low and the surface energy correspondingly high which promotes coagulation. (R. S. Willows and E. Hatschek, "Surface Tension and Surface Energy", p. 94).

At this stage, the surface energies favoring coagulation or the merging of the colloidal particles in the two adjacent film surfaces exceed the repelling force of the like electrical charges and the foam film is broken down.

However, as concentration of the boiler water by evaporation continues, the positive adsorption in the surface progresses, reducing the surface tension, and, in addition, the electrical charges adsorbed on the colloidal dispersion is further continuously increased, thus further stabilizing the foam. The increase in electrical charges on the colloidal dispersion adsorbed in the surface films is the result of the following phenomenon:

The bubbling of gases through liquids produces electrification of the gas, but electrification is dependent upon the breaking of the liquid film when the bubble escapes from the liquid. (J. J. Thomson: The Electron in Chemistry, p. 81). The nature of such acquired charges varies for the same gas in different solutions, and for different gases in the same solution. For instance, air bubbled through pure or alkaline water emerges with a negative charge, whereas electrification of air becomes positive when bubbled through water made slightly acid with hydrochloric or sulphuric acid. Likewise, different gases passed through the same solution may receive either positive or negative electrification. I have discovered that steam rising through alkaline water in a locomotive boiler was negatively electrified, which upon emerging from the bubble at the surface left an equal positive charge in the surface of the water. These positive charges were apparently adsorbed on the colloidal dispersion already concentrated in the upper surface stratum, since they were collected on a one-inch iron pipe (7 sq. ft. surface) immersed therein by contacting same to the boiler metal which was found to be electro-negative to the charges collected due to its contact with the electro-negative steam under 200 pounds pressure per square inch. A potential difference of approximately one volt existed between the iron pipe and the boiler shell, and a constant flow of approximately five amperes was registered when steam was withdrawn from the boiler in service. This discovery of the surprising magnitude of the electric current generated by the steam bubble electrification indicates the unusually high degree of ionization of the water molecule at boiler temperature and pressure, and also demonstrates the degree of dissociation of water into ions by the rising steam bubbles. The accumulation of these positive ions adsorbed on the colloidal dispersion due to electrification of the steam rising from the surface, and the concentration of molecular and colloidal matter in the surface films with consequent reduction of surface tension all tend to promote a foaming condition.

To prevent foam or to break down foam already formed, it is but necessary to cause the merging of the two surfaces of the films, or, in other words, cause the colloidal dispersion to coalesce and precipitate, by upsetting the equilibrium of opposing forces in the surface films. Neutralization of electrical charges adsorbed in the films promotes coagulation of the colloidal dispersion, thus destroying foam.

It is an object of my invention, therefore, to prevent the formation of foam in a liquid and to reduce such a foam by neutralizing and removing the electric charges from the colloidal particles suspended in the liquid or adsorbed in the films of the foam, by physical means.

It is a further object of my invention to provide a new and improved device which may be quickly and easily mounted within a boiler shell or other enclosure for accomplishing the function mentioned above, this device being simple in construction, inexpensive to manufacture, efficient and durable.

I successfully accomplish the neutralization of the adsorbed electric charges by various physical means; e. g., by causing the colloidal dispersion to contact a metal screen which is disposed horizontally in the surface of the water with additional screens disposed in the steam space to intercept all foam before it reaches the throttle valve or point of steam egress. These screens may be directly grounded to the boiler shell, which is charged negatively due to contacting the partially ionized steam which emerges from the water surface electrified negatively. The adsorbed ions of the colloidal dispersion are induced to give up their charges to this screen, thus causing the coalescing of the colloids and the film surfaces.

I consider that a much greater number of positive charges are collected on the negative conducting screen immersed below the surface of the water than would normally accumulate in the surface in the absence of the metal screen. I attribute this to the collection of the positive ions from the water side of the steam bubble on the metal screen before the bubble reaches the surface, at which time there is a greater number of dissociated ions in the double layer at the steam-water interface. This assumption is based on Thomson's statement (J. J. Thomson—"The Electron in Chemistry"—1923, p. 85; "Thus the emergence of the bubble involves a considerable and very abrupt contraction of the surface and of the double layer associated with it. The double layer will be violently distorted and it does not seem surprising that some of the ions in the layer on one side should not have time to combine with those on the other before they are carried away by the air. Only a very small fraction of the ions in the double layer get liberated when air bubbles through water."

Another method of neutralizing the charges consists of causing a gas to pass through the water concurrently with the steam, the gas to be such as will be electrified with positive charges, or of opposite sign to the electrification of the steam.

Still another method, embodying my invention, for neutralizing the adsorbed charges lies in the electrolytic production of a minute quantity of electrolyte at a point where it will come into contact with the foam, the electrolyte being of such a type as will electrically neutralize the charges on the films.

In extreme cases, where large quantities of colloidal material are carried by the water, I contemplate also immersing an electrode in the liquid in spaced relation to a foraminous member such as above referred to and insulated from the boiler shell, and impressing a sufficiently high E. M. F. between the electrode and the member to induce the colloidal particles to travel to the foraminous member and thus give up their charges.

Various other objects and advantages will become readily apparent to those skilled in the art as the description proceeds.

Referring now to the drawings forming part of this specification and illustrating a preferred form of a device embodying my invention:

Fig. 1 is a side elevation of a locomotive boiler embodying part of my invention, a part of the boiler shell being broken away so as to reveal the inner construction;

Fig. 2 is a sectional view taken on the line 2—2 of Fig. 1;

Fig. 3 is a sectional view taken on the line 3—3 of Fig. 1;

Fig. 4 is a fragmentary sectional view of a portion of a device forming a different embodiment of my invention;

Fig. 5 is a sectional view through a boiler shell forming a portion of still another embodiment of my invention, with certain features being shown diagrammatically;

Fig. 6 is a longitudinal sectional view through a locomotive boiler shell containing apparatus representing still another embodiment of my invention.

Fig. 7 is a detailed sectional view on an enlarged scale of the embodiment of Fig. 6;

Fig. 8 is a transverse sectional view taken on the line 8—8 of Fig. 7;

Fig. 9 is a view similar to Fig. 7 and showing still another embodiment of my invention, and Fig. 10 is a sectional view taken on the line 10—10 of Fig. 9.

While it will be readily understood that devices embodying my invention and the method thereof may be applied to boilers of various types, and even to liquid containers other than boilers, I have chosen a locomotive boiler as a convenient illustration.

Referring now to Figure 1, there is shown here a portion of a locomotive boiler, indicated generally at 10, having a smoke stack 13, a firebox 14 having a crown sheet 14', and an engineer's cab 15. As is well understood in the art, boilers of this class are of the fire-tube type, gas-conducting tubes 16 being provided below the liquid level, indicated at 18. A plurality of vertical stay-bolts 20 are arranged in spaced relation between the upper wall or crown sheet 14' of the firebox 14 and the upper portion of the boiler shell.

Thus, it will be seen that the boiler is divided into a substantially cylindrical compartment 22 in the forward portion of the boiler and a compartment 23 in the rear portion of the boiler which is segmental in cross section, as seen best in Figure 3.

In fitting a boiler of the type shown with a device embodying my invention, I arrange in the forward portion 22 a horizontal foraminous member 25. The member 25 is formed of any suitable electrically conducting material, and most conveniently and economically comprises a wire-mesh screen. The degree of coarseness of the mesh may be determined by the nature of the water which is being used, the principal requirement being that it will permit easy passage of the fluid and will not become readily clogged with foreign matter. I have found a screen of about ten mesh to the inch, or coarser, quite satisfactory for ordinary purposes.

The member 25 is supported in a substantially horizontal plane within the boiler by means of angle bars 27 which may be secured longitudinally of the boiler by spot-welding them to the inner walls thereof, or by other suitable means. These bars are preferably formed of conducting material. While the member 25 may be extended forward any desired distance from the firebox 14, it is preferred to have it extend at least half the length of the tubes 16, inasmuch as this portion of the tubes is the hottest and hence evaporation in this section of the boiler is most rapid.

Referring to Figures 1 and 3, it will be seen that the screen 25 is bent upwardly adjacent its rear end so as to form a portion 30 which is substantially segmental in shape to fit the contour of the boiler and lies in substantially a vertical plane. If desired, a similar vertical portion (not shown) may be formed adjacent the forward extremity of the member 25. No foam can then reach the throttle valve or steam egress without contacting with the screen, whereupon it is destroyed.

Extending across the boiler adjacent the rear end of the member 25 and substantially parallel therewith is a rod 32 (Figures 2 and 3), which may be secured to the boiler shell by any suitable means. In the particular embodiment shown, the ends of the rod extend through the walls of the boiler, and nuts 33 or the like are secured to their extremities so as to make a steam-tight connection with the boiler. Adjacent the rear end of the boiler is a similar rod 35 which is substantially parallel to the rod 32. A plurality of clips 36 embrace the rods 32 and 35 and serve to retain strips 38 of foraminous conducting material, such as wire mesh or the like. These strips 38 are secured to the clips 36 by means of rivets or the like and are arranged between the stay-bolts 20 so as to lie in a substantially horizontal plane below the surface of the liquid in the segmental compartment 23. The forward ends of the strips 38 are arranged a slight distance below the member 25 so that there is a slight overlapping therebetween.

It will be seen that in the operation of the boiler, the liquid and bubbles must pass through the foraminous members due to the convection currents in the liquid and natural rise of the bubbles, and in such passage the colloidal particles are induced to give up their electric charges to the screen. Since the foraminous members are grounded to the boiler shell, obviously they will rapidly conduct away the electric charges. Should any foam be formed in the compartment 23, due to the spaces between the strips 38, such foam will have to pass through the member 30, where it will be electrically neutralized and hence reduced. It is understood that any number of screen members may be located in the path of the steam to intercept any foam. It is noted that a difference of potential of appreciable magnitude exists between the water surface aggregate, comprising the colloidal dispersion and the adsorbed ions, and the screen. This is believed to cause the migration of and neutralization of the colloidal particles.

In some cases where a large quantity of colloidal material is suspended in the water, it may be desired to augment the effect of the foraminous members by electrolytic movement of the colloidal particles. Such a movement may be set up by arranging within the boiler a suitable electrode. I have shown as a preferred embodiment, in Figures 1 and 2, an electrode 40 which may be conveniently formed of iron pipe or the like. As shown in Figure 2, this electrode comprises a pair of longitudinal members 42 and 42' which may be secured to the inner walls of the boiler shell by means of suitable lugs 45, annular insulating members 46 being provided between the supporting lugs and the electrode. To the electrode 40 is connected, as by a suitable fitting 47, a conductor member indicated generally at 48. This conductor member comprises a metal rod enclosed in a molded cylindrical member (Fig. 2) formed of a phenol condensation product. A suitable bushing 50 (Fig. 2) is provided in the wall of the boiler shell to permit the passage of the conductors therethrough, this bushing being preferably of the type disclosed in my application for United States Letters Patent, Serial No. 230,033, filed October 31, 1927. The conductor 48 is connected to a suitable source of E. M. F., such as indicated diagrammatically at 53, which may be grounded by means of a conductor 55 to the boiler shell or other suitable ground.

The electrode 40 is preferably spaced a short distance, such as a few inches, from the foraminous member 25, and it will be readily apparent that when an E. M. F. is impressed upon the electrode an electrolytic migration of the colloidal particles between the electrode and the screen will be set up so that the particles will be induced to give up their charges on the screen.

It is to be understood, however, that the use of an electrode is not an indispensable but an optional part of my invention, inasmuch as the foraminous members will function satisfactorily alone under most conditions to prevent foaming.

Figure 4 illustrates a modified embodiment of my invention wherein, instead of a single screen, I may use a pair of screens 60 and 61 in place of the members 25, 30 and 38. These screens, as shown in Figure 4, are preferably of different degrees of fineness so as to insure intimate contact of all the colloidal particles with the conducting material. In a preferred embodiment, the screen 61 may be, say, about thirty mesh to the inch, while the screen 60 may be of about ten mesh to the inch or coarser and formed of heavier wire, thus increasing the electrical conductivity. However, it will be obvious that these values may be varied within wide limits.

Figure 5 shows a foraminous member 75 which may be in the form of a screen similar to either of those described above, electrically insulated from the boiler metal, insulating members 76 being disposed between the screen and angle members 78 which serve to secure it within the boiler shell.

A suitable conductor 80 is connected to the foraminous member 75, an insulator 81, preferably of the same type as the device shown in Figure 2, being provided where the conductor passes through the boiler shell. The conductor 80 preferably leads into a storage battery 82 and lamps 83 may be arranged in parallel for the illumination of a gauge glass or other apparatus within the cab, or for other illuminating purposes. An indicating device 84 may be arranged in the circuit for determining the conditions existing within the boiler, this indicator being on the principle of a galvanometer or of any other suitable type. It is also contemplated, of course, that current may be taken from this circuit for the charging of a storage battery or batteries arranged in parallel relation, or current may be withdrawn for any other desired purpose. The circuit is completed by means of a conductor 87 grounded to the boiler shell as at 88.

The operation of the embodiment shown in Figure 5 must be obvious. Since it is apparent, as described above, that the charged colloidal particles which come in contact with the foraminous member are caused to give up their charges, an accumulation of a large number of such charges, even though individually very small, will amount to an appreciable current if the foraminous member is insulated from the boiler shell as indicated in Figure 5 and the current is conducted away for utilization before being grounded to the boiler shell.

It is also contemplated by my invention that a permeable conductor member or members, such as the screen 25, may be arranged, if desired, above the surface of the liquid. In this case, while the formation of foam will not be prevented, the foam may be effectively reduced after it has been formed, by removing the electric charges from the colloidal particles adsorbed on the films and thus inducing coalescence. Thus, a screen may be placed directly below the steam dome to intercept all foam.

Referring now to Figures 6, 7, and 8, as shown here, a boiler shell of the same type as those described above is equipped with electrodes 90 arranged in the upper portion of the steam space and projecting a slight distance into the water in such a manner as to intercept foam to prevent its passage to point of egress, as shown, for instance, in Figure 8, it being understood that similar pairs of screens may be arranged in a horizontal plane in the steam space underneath the steam dome to better intercept foam. These electrodes comprise a molded frame member 92 of a phenol condensation product or the like, in which is arranged a pair of metal screens 93, these screens being separated from each other by a relatively short distance and maintained in substantially parallel planes by means of insulating spacer members 94. The frame 92 and screens 93 are preferably segmental in shape, as shown best in Figure 8, and the screens are preferably of copper wire, although other metals may be used. A pair of conductor wires 96, 96' are connected respectively to the two screens 93. An insulating bushing 97 is arranged to lead the conductors 96 through the boiler shell and provide a steam-tight fitting. The conductors 96, 96' are connected to a source of E. M. F. 97. The lower edges of the electrode screens are supported by insulating material 92 which extends below the surface of the liquid.

In the case of practically all boiler waters, sodium sulphate is adsorbed in the foam films and will act as an electrolyte, for conducting an electric current. An E. M. F. impressed across the screens 93 will cause a tiny current to flow through the liquid films of the foam, dissolving a very small amount of metal. Using copper screens, copper will dissolve to form copper sulphate as the foam contacts both screens. Since copper sulphate in many cases is a colloid-precipitating electrolyte, it will effectively break down such foam passing through the electrically charged screens. Other metals may be used to produce other electrolytes that may be found effective. The chief advantage of this method is the extreme economy of the electrolyte, which is produced only when needed and in infinitesimally small quantities, decomposing the metal screen lyte are effective in precipitating considerable colvery slowly, since only minute traces of electroloidal dispersions. Likewise, the current consumption is negligible.

Figures 9 and 10 show still another embodiment for effectively breaking down foams in a locomotive boiler. In this embodiment, a metal plate 100 is arranged transversely in the steam space between that portion of the steam space above the firebox, which is the hot end of the flues and comprises the most efficient evaporating surfaces, and the throttle dome or point of steam egress, this plate being segmental in shape, as shown best in Figure 10, and fitting snugly against the boiler shell and extending slightly below the level of the water to a point approximately six inches above the highest point of the crown sheet 14'. The plate 100 is preferably provided with a hinged door 101 to permit a person passing the partition for inspection purposes. A plurality of pipes 103, preferably of metal and preferably having internal helical grooves 105, pass through the plate 100 above the level of the water and may be retained by means of straps 106 secured to the top of the boiler shell, or other suitable means. These pipes are preferably of such a size as to aggregate the capacity of the throttle valve opening and extend forwardly above the water to within a short distance of the front tube sheet. Disposed opposite the forward end of the tubes 103 may be suspended a metal screen or screens 108, which is also preferably segmental and fits snugly within the steam space above the water level.

This arrangement of the pipes and baffle 108 destroys the foam by a combination of effects. For one thing, the spiral grooves within the pipes tend to centrifuge much of the moisture from the steam. Furthermore, the foam is brought into contact with the periphery of the pipe, which being grounded to the boiler shell will be of negative electric charge, thus effectively neutralizing the positively charged ions adsorbed in the films and destroying the foam. As an additional insurance that all foam will be reduced, the metal screens opposite the front end of the pipes will further contact any residual foam to neutralize the electric charges. Another effect of diverting steam to the front end of the boiler is that the additional time element between the evaporation and the egress of the steam will permit considerable foam to break down. Furthermore, any residual foam discharged from the pipes will rest upon water of lower alkali salt concentration due to dilution by the feed water injected into the front end of the boiler by well known means, (not shown) and the residual calcium and magnesium salts in the feed water injected here being effective coagulating agents destructive to foam.

This embodiment embodies several features, all of which are not essential, the combination being shown to illustrate means for effectively reducing persistent foaming. Thus, helical grooves 105 may be omitted from the pipes 103 if desired and ordinary straight pipe substituted therefor.

I have discovered still another method for preventing the formation of foam, this method comprising the bubbling of a gas through the liquid by any suitable means arranged within the boiler shell, it merely being necessary that the gas be such that in the course of its discharge through the liquid it will be electrified with charges opposite in sign to that of the steam, which is usually negatively charged. As this gas, which in alkaline waters may be hydrogen, emerges from the water surface it will leave negatively charged ions in the water surface which will neutralize their equivalent of positive ions, thus distorting the surface equilibrium. Since hydrogen is an effective gas in alkaline boiler waters, which are most common, its evolution is easily effected from the major evaporating surfaces of the firebox and rear end of flues by disposing insulated anodes at spaced intervals and passing an applied electric current uniformly to the evaporating surfaces, thus evolving hydrogen thereon.

If other gases are utilized, these may be introduced through pipes having very fine perforations along their length, arranged in the lower part of the boiler to permit the gas to rise concurrently with the steam, or a gas-liquid emulsion may be prepared and injected into the boiler where the gas would rise with the steam, thus neutralizing its equivalent of electrical charges accumulated in the water surface.

It is apparent that these methods can be applied to any liquid subject to foaming with any gas by simply applying an opposite charge to the intercepting screen or by introducing a gas which by rising through the specific liquid will be electrified with the opposite sign to that acquired by the gas in the foam.

It also will be apparent to those skilled in the art that the processes and devices described herein are merely exemplary and by no means limiting and that many other variations and modifications may be made therein without departing from the spirit of my invention. Hence, I do not wish to be limited to the particular embodiments or uses mentioned except to the extent outlined in the appended claims, which are to be construed as broadly as is consistent with the state of the art.

I claim as my invention:

1. The method of preventing and reducing foam in liquids, which comprises inserting a pair of metal electrodes in the liquid, imposing an E. M. F. between the electrodes to thereby cause the production of an electrolyte in the liquid and contacting the foam bubbles with the electrolyte to neutralize the electrical charges contained on the foam bubbles to thereby destroy the foam.

2. The method of preventing and reducing foam in steam boilers, which comprises inserting a pair of copper electrodes in the boiler water, imposing an E. M. F. between the electrodes to thereby cause the production of copper and sulfate ions in the boiler water due to the presence in the water of certain sulfates and impurities, and contacting the foam bubbles with the ions to thereby neutralize the electrical charges on the foam bubbles and consequently destroy the foam.

3. The method of subsiding foam in a steam boiler, which comprises producing a relatively small quantity of an electrolyte having an electrical charge opposite to that of the colloidal substances in the foam by imposing an electromotive force upon an anode so positioned as to be contacted by the foam when present in excessive quantities, the metallic constituent of the anode being of such character as to produce said electrolyte when an electrical circuit is established by said foam.

4. The method of subsiding foam in liquids, which comprises locally generating a small quantity of an electrolyte having an electrical charge opposite to that of the colloidal substances in the foam by imposing an electromotive force upon an electrode so positioned as to be contacted by the foam or liquid, said electrode being of such character as to produce said electrolyte when an electrical circuit is established by said foam or liquid.

5. Apparatus for preventing and reducing foam in steam boilers which comprises, in combination, a steam boiler, a pair of copper electrodes in the boiler and in contact with the water therein, and means for imposing an electromotive force between the copper electrodes to produce ions in the boiler water for neutralizing the electrical charges on the foam bubbles to destroy the same.

6. Apparatus for subsiding foam in steam boilers which comprises, in combination, metal electrodes located above the normal water level in the boiler and adapted to contact foam when it rises abnormally into the boiler steam space, and means for generating an electromotive force between said electrodes to produce an electrolyte for the destruction of foam bubbles.

LEWIS O. GUNDERSON.